US009720068B2

(12) United States Patent
Nakamura et al.

(10) Patent No.: US 9,720,068 B2
(45) Date of Patent: Aug. 1, 2017

(54) ACOUSTIC PROCESSING DEVICE AND ACOUSTIC PROCESSING METHOD

(71) Applicant: HONDA MOTOR CO., LTD., Tokyo (JP)

(72) Inventors: Keisuke Nakamura, Wako (JP); Kazuhiro Nakadai, Wako (JP); Tetsuo Kinoshita, Sendai (JP); Hideyuki Takahashi, Sendai (JP); Lana Sinapayen, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 14/808,444

(22) Filed: Jul. 24, 2015

(65) Prior Publication Data

US 2016/0033615 A1 Feb. 4, 2016

(30) Foreign Application Priority Data

Aug. 1, 2014 (JP) .................................. 2014-158083
Feb. 9, 2015 (JP) .................................. 2015-023308

(51) Int. Cl.
*G01S 3/80* (2006.01)

(52) U.S. Cl.
CPC ...................................... *G01S 3/80* (2013.01)

(58) Field of Classification Search
CPC ........................................................ G01S 3/80
See application file for complete search history.

(56) References Cited

U.S. PATENT DOCUMENTS

2016/0033615 A1* 2/2016 Nakamura ................ G01S 3/80
367/118

FOREIGN PATENT DOCUMENTS

JP 2016035443 A * 3/2016 ............... G01S 3/80

OTHER PUBLICATIONS

N. Ono, et al., "Ad-hoc Microphone Array—Acoustic Signal Processing Using Multiple Mobile Recording Devices . . . ", IEICE Fundamentals Review, vol. 7, No. 4, (2014), pp. 336-347, English Abstract Included, Discussed in the Specification.

* cited by examiner

*Primary Examiner* — Daniel Pihulic
(74) *Attorney, Agent, or Firm* — Rankin, Hill & Clark LLP

(57) ABSTRACT

An acoustic processing device includes: a sound pickup unit configured to record an acoustic signal; a motion detection unit configured to detect the motion of the device; a self-localization unit configured to estimate the position of the device based on the acoustic signal and the motion; and a use determination unit configured to determine whether or not to use the acoustic signal in a sound source localization unit detecting the position of a target sound source to be detected based on the intensity of a reference signal incoming from a reference sound source determined in advance.

11 Claims, 6 Drawing Sheets

ACOUSTIC PROCESSING DEVICE AND ACOUSTIC PROCESSING METHOD

CROSS-REFERENCE TO RELATED APPLICATION

Priority is claimed on Japanese Patent Application No. 2014-158083, filed on Aug. 1, 2014, and Japanese Patent Application No. 2015-23308, filed on Feb. 9, 2015, the contents of which are incorporated herein by reference.

BACKGROUND

Field of the Invention

The present invention relates to an acoustic processing device and an acoustic processing method.

Background

The estimation of the direction or position of a sound source from a recorded acoustic signal is referred to as sound source localization (SSL), and extensive applications, such as robot auditory detection, voice recognition, high-quality telecommunication, and sound source search, are expected. In sound source localization, since a minute time difference or level difference between channels is used as a key, acoustic signals of multiple channels are required to be recorded. For this reason, a microphone array having a plurality of microphones has been used. On the other hand, a microphone array configured by integrally arranging a plurality of microphones tends to be large in size, and it may be impossible to secure an installation space. Recently, there have been attempts to use a plurality of microphones distributively arranged as a microphone array.

For example, "Nobutaka ONO, Kien LE TRUNG, Shigeki MIYABE, Shoji MAKINO, Ad-Hoc Microphone Array—Acoustic Signal Processing Using Multiple Mobile Recording Devices—, Fundamentals Review, The Institute of Electronics, Information and Communication Engineers, Foundation/Boundary Society, April, 2014, Vol. 7, No. 4, pp. 336-347" describes microphone array processing which shares sound signals picked up by microphones provided in a plurality of mobile terminals through wireless communication and performs sound source localization based on the shared sound signals. In the microphone array processing described in "Nobutaka ONO, Kien LE TRUNG, Shigeki MIYABE, Shoji MAKINO, Ad-Hoc Microphone Array—Acoustic Signal Processing Using Multiple Mobile Recording Devices—, Fundamentals Review, The Institute of Electronics, Information and Communication Engineers, Foundation/Boundary Society, April, 2014, Vol. 7, No. 4, pp. 336-347", information regarding the positional relationship between the mobile terminals is used. In order to perform sound source localization, each mobile terminal is fixed at a position determined in advance, and pre-processing, such as self-localization (calibration), is required using an acoustic signal emitted from a predetermined sound source.

SUMMARY

However, there are various arrangements of devices with a microphone, and the arrangement is changed as needed. For example, the mobile terminals are generally used while being carried by users.

On the other hand, it is not practical to perform calibration or to force the user to perform operation for calibration at each time there is a change in position.

An object of aspects of the invention is to provide an acoustic processing device which enables sound source localization without performing calibration in advance.

(1) An acoustic processing device according to an aspect of the invention includes: a sound pickup unit configured to record an acoustic signal; a motion detection unit configured to detect the motion of the device; a self-localization unit configured to estimate the position of the device based on the acoustic signal and the motion; and a use determination unit configured to determine whether or not to use the acoustic signal in a sound source localization unit detecting the position of a target sound source to be detected based on the intensity of a reference signal incoming from a reference sound source determined in advance.

(2) In the aspect of (1) described above, the sound source localization unit may detect the position of the target sound source based on positional information indicating the position estimated by the self-localization unit, a second acoustic signal acquired from a second acoustic processing device, and second positional information acquired from the second acoustic processing device.

(3) In the aspect of (2) described above, the use determination unit may transmit master device notification information indicating that the device is a master device to the second acoustic processing device in a wireless manner based on the time at which it is determined to use the acoustic signal and the positional information for sound source localization, and may receive the second acoustic signal and the second positional information from the second acoustic processing device in a wireless manner.

(4) In the aspect of (2) described above, when the use determination unit receives, from the second acoustic processing device, master device notification information indicating that the device is a master device, the acoustic signal and the positional information may be transmitted to the second acoustic processing device in a wireless manner.

(5) In the aspect of (1) described above, the sound source localization unit may update the position of the target sound source so as to decrease the magnitude of the difference between a predicted value of the intensity of an acoustic signal estimated based on a predicted value of the position of the target sound source and a measured value of the intensity of an acoustic signal recorded by the sound pickup unit.

(6) In the aspect of (5) described above, the sound source localization unit may update the position of the target sound source so as to decrease the magnitude of the difference between a predicted value of the position of the target sound source and a predicted value of the position of the target sound source based on the second acoustic signal recorded in the second acoustic processing device.

(7) In the aspect of (6) described above, in the update of the position of the target sound source, the sound source localization unit may calculate the amount of update by multiplying a product of the total of the difference and a matrix obtained by normalizing a covariance matrix representing the distribution of the predicted value of the position by a positive coefficient equal to or less than 1, and may update the predicted value of the position based on the amount of update.

(8) In the aspect of any one of (1) to (7) described above, the acoustic processing device may be provided in a movable mobile object.

(9) In the aspect of (8) described above, the mobile object may be a flying object.

(10) In the aspect of (8) described above, the mobile object may be a robot.

(11) An acoustic processing method in an acoustic processing device according to another aspect of the invention, the acoustic processing method includes: estimating the position of the device based on an acoustic signal recorded by a sound pickup unit and the motion of the acoustic processing device detected by a motion detection unit; and determining whether or not to use the acoustic signal in a sound source localization unit detecting the position of a target sound source to be detected based on the intensity of a reference signal incoming from a reference sound source determined in advance.

According to the aspects of (1) and (11) described above, the position of the device is estimated based on the reference signal included in the recorded acoustic signal and the detected motion, and it is determined whether or not to use the acoustic signal for the sound source localization based on the intensity of the reference signal. For this reason, since the positional information of the device is acquired from the recorded acoustic signal, and it is determined whether or not the recorded acoustic signal is used for the sound source localization, the sound source localization becomes possible even if calibration is not performed in advance.

According to the aspect of (2) described above, the sound source localization using the difference in sound pickup characteristic due to the position between the acoustic processing devices becomes possible based on acoustic signals and positional information which are determined to be used based on the intensity of the reference signal and are acquired from other acoustic processing devices.

According to the aspect of (3) described above, it can be determined that the device is a master device as the reference of the sound source localization, other acoustic processing devices can be notified of the determination result, and the acoustic signals and the positional information indicating the position of each of other acoustic processing devices can be acquired in a wireless manner from other acoustic processing devices. For this reason, it is possible to collect information for performing the sound source localization to the device. Furthermore, since a member for physical wiring is not required when collecting information for performing the sound source localization, the degree of freedom of the arrangement is improved.

According to the aspect of (4) described above, it is possible to recognize another acoustic processing device which is a master device, and to provide the positional information indicating the position of the device and the recorded acoustic signal required for the sound source localization to the master device in a wireless manner. Furthermore, since a member for physical wiring is not required when providing information for performing the sound source localization, the degree of freedom of the arrangement is improved.

According to the aspect of (5) described above, it is possible to perform the sound source localization based on the acoustic signal acquired by the individual acoustic processing device. The individual acoustic processing device includes the sound source localization unit, whereby it is not necessary to transmit and receive the acoustic signal between the acoustic processing devices, and it is therefore possible to effectively use the transmission capacity between the acoustic processing devices. Furthermore, it is not necessary to simultaneously process the acoustic signals among a plurality of acoustic processing devices, and it is therefore possible to reduce a processing amount.

According to the aspect of (6) described above, since the predicted values of the position of the target sound source including different errors depending on the difference in acoustic environment or process characteristic between the acoustic processing devices converge to each other, and the errors are cancelled, it is possible to improve the accuracy of the sound source localization.

According to the aspect of (7) described above, the amount of update of the predicted value related to the position of the target sound source is made smaller than a value obtained by normalizing the total of the difference in the predicted value of the position of the target sound source predicted by each acoustic processing device according to the distribution of the predicted value, whereby it is possible to prevent the divergence of the predicted value.

According to the aspect of (8) described above, since the positional information of the device moving is autonomously acquired along with the recorded acoustic signal, it is possible to consecutively perform the sound source localization.

According to the aspect of (9) described above, since the positional information of the device flying is autonomously acquired along with the recorded acoustic signal, it is possible to consecutively perform the sound source localization. Furthermore, according to the aspect of (9) described above, since the device is not necessarily supported on the ground, the degree of freedom of the arrangement is improved.

According to the aspect of (10) described above, since the positional information of the device provided in the robot is autonomously acquired along with the recorded acoustic signal, it is possible to perform the sound source localization with the position of the robot as a reference.

DESCRIPTION OF THE EMBODIMENTS

Figure 1:
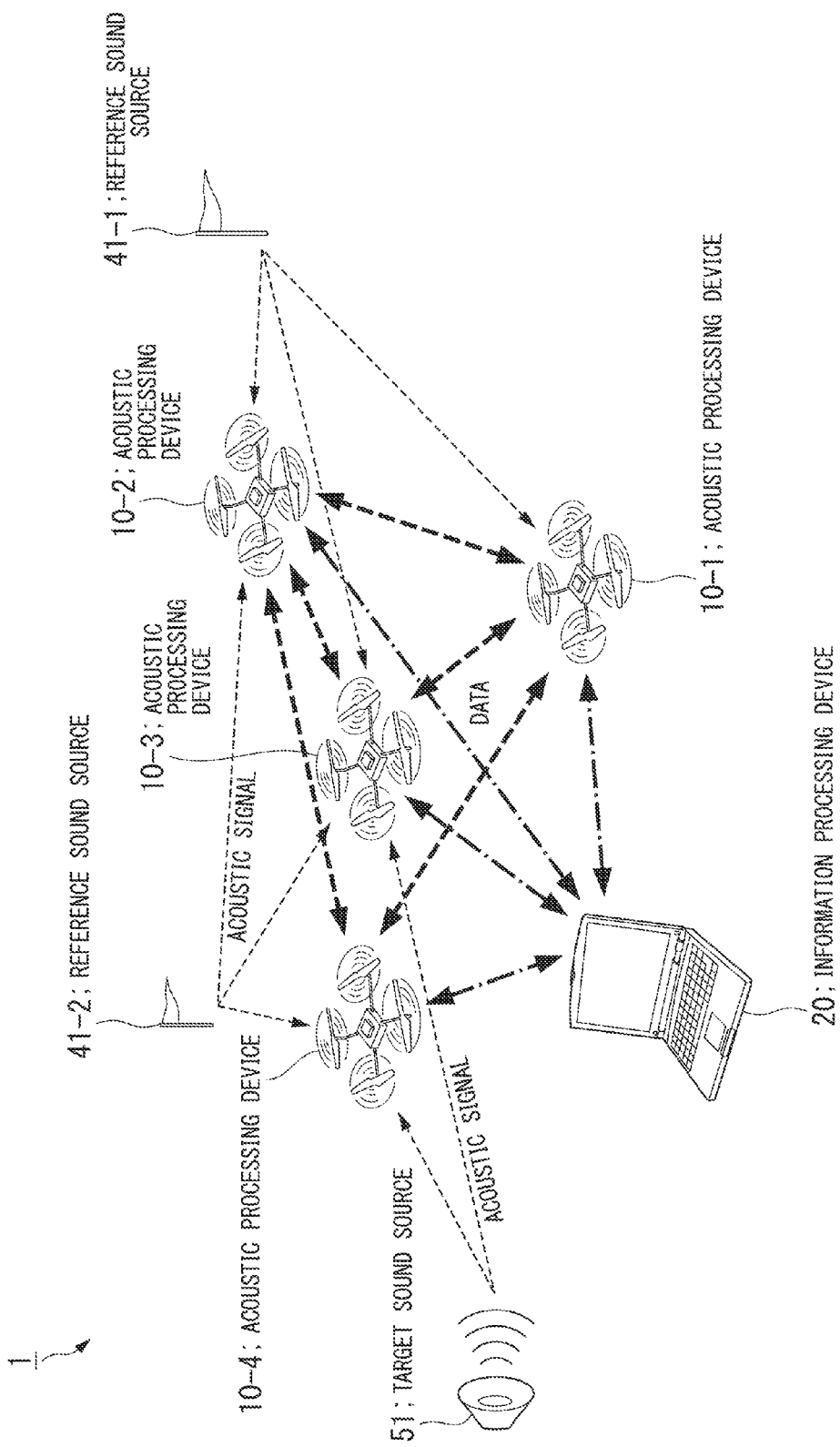
FIG. 1 is a conceptual diagram showing the configuration of an acoustic processing system according to an embodiment of the invention.

Hereinafter, an embodiment of the invention will be described referring to the drawings.

FIG. 1 is a conceptual diagram showing the configuration of an acoustic processing system 1 according to this embodiment.

The acoustic processing system 1 includes N (where N is an integer equal to or greater than 2, for example, 4) acoustic processing devices 10-1 to 10-N, an information processing device 20, and M (where M is an integer equal to or greater than 1, for example, 2) reference sound sources 41-1 to 41-M. In the following description, when there are no distinctions among the acoustic processing devices 10-1 to 10-N, the acoustic processing devices 10-1 to 10-N are simply referred to as acoustic processing devices 10. When there are no distinctions among the reference sound sources 41-1 to 41-M, the reference sound sources 41-1 to 41-M are simply referred to as reference sound sources 41.

An acoustic processing device 10 includes a mobile object and one sound pickup unit (described below). The mobile object is, for example, a quadrocopter. The quadrocopter is a flying object (drone) including four rotary wings. The sound pickup unit and other members are mounted in the mobile object, whereby the acoustic processing device 10 is movably formed.

The acoustic processing device 10 performs self-localization based on sound waves incoming from the reference sound sources 41-1 to 41-M. The self-localization indicates the identification of the position of the device (main body, acoustic processing device 10). The acoustic processing device 10 determines whether or not to use various kinds of data acquired by the device based on the intensities of acoustic signals incoming from the reference sound sources 41-1 to 41-M for sound source localization of an unknown sound source (for example, a target sound source 51) different from the reference sound sources 41-1 to 41-M.

An acoustic signal recorded by the device and positional information indicating the position of the device correspond to data acquired by the device.

In the following description, the use of the data for the sound source localization is simply referred to as "use", and the acoustic processing devices 10 related to the use may be referred to as "use devices". The acoustic processing devices 10 other then the "use device" may be referred to as "non-use devices".

When the number of use devices is equal to or greater than a predetermined number of devices (for example, 2), a microphone array is formed by the sound pickup units provided in the use devices. One of the use devices receives, from other use devices, positional information indicating the position identified by each of other use devices and an acoustic signal recorded by each of other use devices.

In the following description, one use device is referred to as a "master device", and other use devices are referred to as "slave devices". The master device performs sound source localization based on the position identified by each use device and an acoustic signal recorded by each use device, thereby determining space information (direction or position) of an unknown sound source.

The master device transmits the determined sound source space information of each sound source to the information processing device 20.

The information processing device 20 receives the sound source space information from the master device among the acoustic processing devices 10 and stores the received sound source space information in association with time information indicating the reception time. The information processing device 20 is, for example, a personal computer (PC) with no moving mechanism, a server device, or other ground station devices.

The information processing device 20 is likely to receive the sound source space information from any of the acoustic processing devices 10-1 to 10-M. This is because any of the acoustic processing devices 10-1 to 10-M can become a master device. Accordingly, the information processing device 20 may assume a predetermined probability distribution (for example, multidimensional Gaussian) for the position of the sound source indicated by the received sound source space information, and may calculate an expected value of the probability distribution as a common sound source position among the M acoustic processing devices 10. Specifically, the information processing device 20 calculates the common sound source position of each sound source using an unscented Kalman Filter (UKF) for the position of the sound source indicated by the received sound source space information. The UKF is a method of calculating a secondary moment as statistics of an error distribution of the state (in this example, the sound source position of each sound source) and consecutively calculating a conditional expected value. With this, since statistics are approximated on the collection average with a plurality of sound source positions as sample points, the sound source position calculated between different acoustic processing devices 10 is smoothed.

Each of the reference sound sources 41-1 to 41-M is a sound source which radiates a reference signal having a predetermined characteristic as a sound wave. The reference signal which is radiated by each of the reference sound sources 41-1 to 41-M is, for example, a sine wave having a frequency determined in advance, and the frequency is different among the reference sound sources 41-1 to 41-M. Each frequency is included in a band which can be detected by the sound pickup unit 101 provided in each acoustic processing device 10, for example, an audible band (for example, 20 Hz to 20 kHz). Accordingly, it is possible to extract a frequency component of a reference signal included in a recorded acoustic signal and to specify a reference sound source, which radiates the reference signal, based on the extracted frequency component.

(Configuration of Acoustic Processing Device)

Next, the configuration of the acoustic processing device 10 according to this embodiment will be described.

Figure 2:
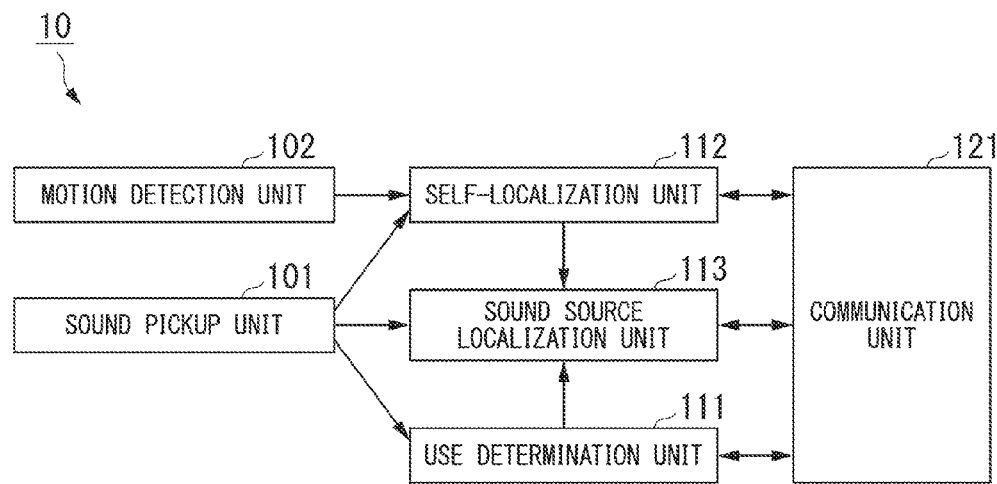
FIG. 2 is a schematic block diagram showing the configuration of the acoustic processing device according to the embodiment of the invention.

FIG. 2 is a schematic block diagram showing the configuration of the acoustic processing device 10 according to this embodiment.

The acoustic processing device 10 includes a sound pickup unit 101, a motion detection unit 102, a use determination unit 111, a self-localization unit 112, a sound source localization unit 113, and a communication unit 121.

The sound pickup unit 101 is a non-directional microphone which converts an acoustic signal incoming as a sound wave to an electrical signal. The sound pickup unit 101 may record an acoustic signal of one channel.

The sound pickup unit 101 outputs the acoustic signal converted to the electrical signal to the use determination unit 111, the self-localization unit 112, and the sound source localization unit 113.

The motion detection unit 102 is a sensor which detects the motion of the device and generates motion information indicating the detected motion. The motion detection unit 102 is, for example, a nine-axis sensor which includes a three-axis magnetic sensor, a three-axis acceleration sensor, and a three-axis gyroscope. As the motion information, acceleration and direction are generated. The motion detection unit 102 outputs the generated motion information to the self-localization unit 112.

The use determination unit 111 determines whether or not to use data (acoustic signal, positional information) acquired by the device for sound source localization based on the intensity of the acoustic signal input from the sound pickup unit 101 (use or non-use determination). The use determination unit 111 filters the input acoustic signal to extract the frequency component of the reference signal corresponding to each of the reference sound sources 41-1 to 41-M and determines whether or not the intensity of the reference signal is higher than a threshold value $L_{th}$ of intensity determined in advance.

When it is determined that the intensity of the reference signal is higher than the threshold value $L_{th}$ for all of the reference sound sources 41-1 to 41-M, the use determination unit 111 determines to use data acquired by the device for the sound source localization. That is, it is determined that the device is a use device. When it is determined that the intensity of the reference signal is not as high as the threshold value $L_{th}$ for all of the reference sound sources 41-1 to 41-M, the use determination unit 111 determines not to use data acquired by the device for the sound source localization. That is, it is determined that the device is a non-use device.

Even if the device is a master device (described below) until just before, when it is newly determined that the device is a non-use device, the use determination unit 111 determines that the device is not a master device.

The use determination unit 111 transmits use information indicating whether the device is a use device or a non-use device to other acoustic processing devices 10 through the communication unit 121. The use determination unit 111 receives the use information from other acoustic processing devices 10 through the communication unit 121. Thereby, the use determination unit 111 can consecutively understand the number of use devices, the acoustic processing device 10 which newly becomes a use device, and the acoustic processing device 10 which newly becomes a non-use device. When the number of use devices is equal to or greater than a predetermined number (for example, 2), the use determination unit 111 determines to perform the sound source localization.

When it is determined that the device becomes a use device earliest among the acoustic processing devices 10 determined to perform the sound source localization, the use determination unit 111 determines that the device is a master device. When another acoustic processing device 10 is a master device and it is newly determined the device is not a use device, and the device becomes a use device earliest among the remaining use devices (including the device), the use determination unit 111 of the device determines that the device is a master device.

When it is determined that the device is a master device, the use determination unit 111 transmits master device notification information indicating the device is a master device to other acoustic processing devices 10 through the communication unit 121.

When the master device notification information is received from other acoustic processing devices 10 through the communication unit 121, the use determination unit 111 determines that the device is a slave device.

The use determination unit 111 outputs the master/slave information indicating whether the device is a master device or a slave device to the sound source localization unit 113.

The self-localization unit 112 performs self-localization based on the motion information input from the motion detection unit 102 and the acoustic signal input from the sound pickup unit 101, and generates positional information indicating the position of the device. The self-localization unit 112 estimates the position of the device using, for example, an extended Karman Filter (EKF). The EKF is a method which consecutively calculates a conditional expected value assuming that the distribution of an error of a certain state (in this embodiment, made of a set of a position and a speed) follows a Gaussian distribution. In the processing, the self-localization unit 112 consecutively updates a state vector made of the position and the speed of the device based on the acceleration indicated by the motion information with distance attenuation of the reference signals incoming from the reference sound sources 41-1 to 41-M among the acoustic signals as a constraint condition. The self-localization unit 112 corrects the direction of the acceleration indicated by the space information to a direction with a predetermined direction (for example, a vertical direction) as a reference using the direction indicated by the space information and uses the corrected acceleration to update the state vector. Details of self-localization will be described below. The self-localization unit 112 outputs the generated positional information to the sound source localization unit 113.

When the master/slave information input from the use determination unit 111 indicates a master device, the sound source localization unit 113 performs sound source localization. The sound source localization unit 113 receives the acoustic signals and the positional information from other use devices through the communication unit 121, receives the acoustic signal from the sound pickup unit 101 as input, and receives the positional information from the self-localization unit 112 as input. The sound source localization unit 113 filters the acoustic signal acquired by each use device to remove the frequency component of the reference signal incoming from each of the reference sound sources 41-1 to 41-M. The sound source localization unit 113 performs the sound source localization based on the acoustic signal filtered for each use device and the positional information acquired by the use device. The sound source localization unit 113 estimates the position of each sound source using, for example, a weighted delay and sum beamforming method (WDS-BF).

The weighted delay and sum beamforming method is a method which calculates a weighted delay and sum signal to the acoustic signal of each channel (use device) and searches sound source space information (sound source direction or sound source position) corresponding to a set of a weight coefficient and a delay of each channel such that the power of the delay and sum signal is the local maximum. The correspondence relationship between the sound source space information and the set of the weight coefficient and the delay is given uniquely by, for example, the distance between the sound source and the sound pickup unit 101 of each use device. The sound source localization unit 113 is not necessarily limited to sound source space information of a single sound source, and may be estimated for each of a plurality of sound sources. The sound source localization unit 113 transmits sound source space information of each sound source to the information processing device 20 through the communication unit 121.

The communication unit 121 transmits and receives data with other devices (in the example shown in FIG. 2, other acoustic processing devices 10 and information processing device 20) in a wireless manner. The communication unit 121 is a wireless communication interface which transmits and receives data using, for example, IEEE 802.11 as the representative wireless communication standard.

(Use or Non-Use Determination)

Next, use or non-use determination will be described.

Figure 3:
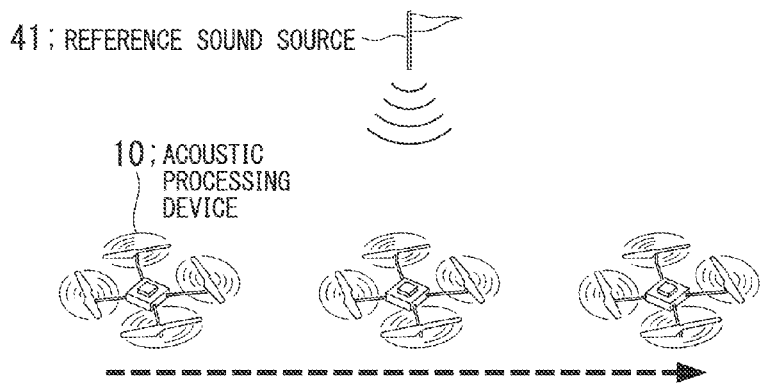
FIG. 3 is a diagram illustrating use or non-use determination by a use determination unit according to the embodiment of the invention.
Figure 3:
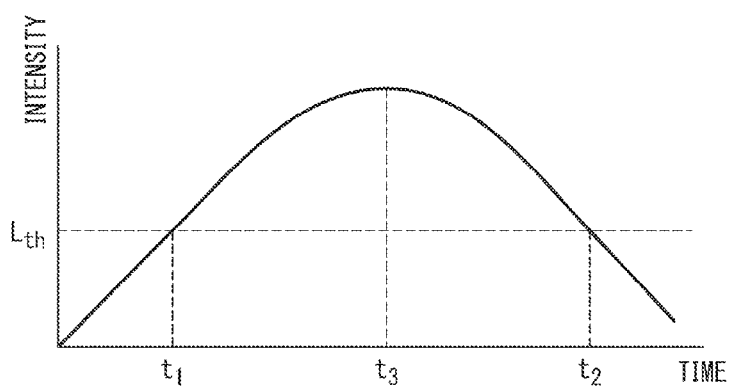

FIG. 3 is a diagram illustrating the use or non-use determination by the use determination unit 111 according to this embodiment.

An upper view of FIG. 3 shows the positional relationship between the reference sound source 41 and the acoustic processing device 10. A broken-line arrow from the left toward the right indicates the movement locus of the acoustic processing device 10. In contrast, the reference sound source 41 remains stationary. In the middle of the movement locus indicated by the arrow, the acoustic processing device 10 is closest to the reference sound source 41, and the acoustic processing device 10 is farther away from the reference sound source 41 when separated farther from the point.

A lower view of FIG. 3 shows a temporal change of the intensity of the reference signal incoming from the reference sound source 41 among the acoustic signals recorded by the sound pickup unit 101. The vertical axis represents time. The horizontal axis represents intensity. The intensity initially increases, reaches a local maximum value at the time $t_3$, and then decreases. The time when the intensity exceeds a threshold value $L_{th}$ of intensity determined in advance is $t_1$, and the time when the intensity falls below the threshold value $L_{th}$ is $t_2$. In the example shown in FIG. 3, the acoustic processing device 10 is determined to be a use terminal in a period from the time $t_1$ to the time $t_2$, and is determined to be a non-use terminal before the time $t_1$ or after the time $t_2$.

The temporal change of the intensity occurs since the acoustic processing device 10 is initially close to the reference sound source 41 and is far away from the reference sound source 41 after becoming closest thereto. For this reason, when the intensity of the reference signal incoming from the reference sound source 41 is sufficient, the self-localization is performed, and the acquired acoustic signal or positional information is used for the sound source localization, whereby it is possible to secure the accuracy of the self-localization, consequently, the sound source localization.

(Self-Localization)

Next, the self-localization will be described. The self-localization based on the EKF includes prediction and correction processes, and the processes are repeated. The self-localization unit 112 corrects the direction of the acceleration indicated by the motion information based on the direction indicated by the motion information input from the motion detection unit 102. The self-localization unit 112 predicts the position and speed at the next time k+1 based on the position and speed at the current time k (or corrected (described below)) and the corrected acceleration. In the prediction, the self-localization unit 112 uses, for example, Expressions (1) and (2).

$$X_{k+1|k} = FX_{k|k} + GU_k \quad (1)$$

$$P_{k+1|k} = FP_{k|k}F^T + V \quad (2)$$

In Expression (1), X indicates a state vector. $X=[x,y,z,v_x,v_y,v_z]^T$. Here, x, y, and z indicate the position of the acoustic processing device 10. $v_x$, $v_y$, and $v_z$ indicate the speed of the acoustic processing device 10. T indicates transposition of a vector or a matrix. k is an index indicating a discrete time. That is, $X_{k|k}$ indicates a state vector at the current time k, and $X_{k+1|k}$ indicates a state vector at the next time k+1 predicted from the state vector at the current time k. F] indicates a linear operator which gives temporal development of $X_{k|k}$ as a function of the time k. F is, for example, $[E, \Delta t \cdot E]^T$. E is a unit matrix of three rows and three columns. $\Delta t$ is a real number (scalar) indicating the time interval between the current time k and the next time k+1. G is a linear operator which gives temporal development of $X_{k|k}$ by $U_k$ as a function of the time k. G is, for example, $\Delta t[0,E]^T$. In [ . . . ], 0 indicates a zero matrix of three rows and three columns. $U_k$ indicates a control signal (vector). $U_k$ is, for example, $[a_x, a_y, a_z]^T$, and $a_x$, $a_y$, and $a_z$ indicate the acceleration of the acoustic processing device 10, that is, the acceleration corrected by the self-localization unit 112.

In Expression (2), P indicates an error covariance matrix. V indicates a process noise covariance matrix.

Next, the self-localization unit 112 corrects the predicted position and speed at the next time k+1 such that an error converges within a predetermined error range. In the correction, the self-localization unit 112 brings the intensity of the reference signal incoming from each reference sound source 41 close to the intensity according to the distance between the reference sound source 41 and the acoustic processing device 10, whereby distance attenuation from the reference sound source 41 is imposed as a constraint condition. Specifically, the self-localization unit 112 uses Expressions (3) and (4).

$$X_{k+1|k+1} = X_{k+1|k} + RB \quad (3)$$

$$P_{k+1|k+1} = P_{k+1|k} - RH_{k+1}P_{k+1|k} \quad (4)$$

In Expressions (3) and (4), R indicates a Kalman gain (matrix) and is calculated as $R = P_{k+1|k} H^T_{k+1} S^{-1}$. H indicates Jacobian to a state vector X of a distance attenuation vector with a distance attenuation function $h_i$ as an element. Here, i is an integer of 1 to M indicating the reference sound source 41-i. The distance attenuation function $h_i$ is calculated as $h_i(X) = I_i/((x_i-x)^2+(y_i-y)^2+(z_i-z)^2)$. $I_i$ indicates the intensity of the reference signal incoming from the reference sound source 41-i at a position at a predetermined distance (for example, 1 m) from the reference sound source 41-i. $x_i$, $y_i$, and $z_i$ indicate the position of the reference sound source 41-i. The position of the reference sound source 41-i is set in advance in the self-localization unit 112. The matrix S is calculated as $S = H^T_{k+1} P_{k+1|k} H^T_{k+1} + W$. W indicates a measurement noise covariance matrix. Measurement noise is noise which is added in order to prevent division by zero when calculating the Kalman gain R. The vector B is calculated as $B = Y_{k+1} - h(X_{k+1|k})$. Y is a system output vector. The system output vector Y is a vector with the intensity of the reference signal incoming from the reference sound source 41-i extracted from the acoustic signal input from the sound pickup unit 101 as an element.

(Acoustic Processing)

Next, acoustic processing according to this embodiment will be described.

Figure 4:
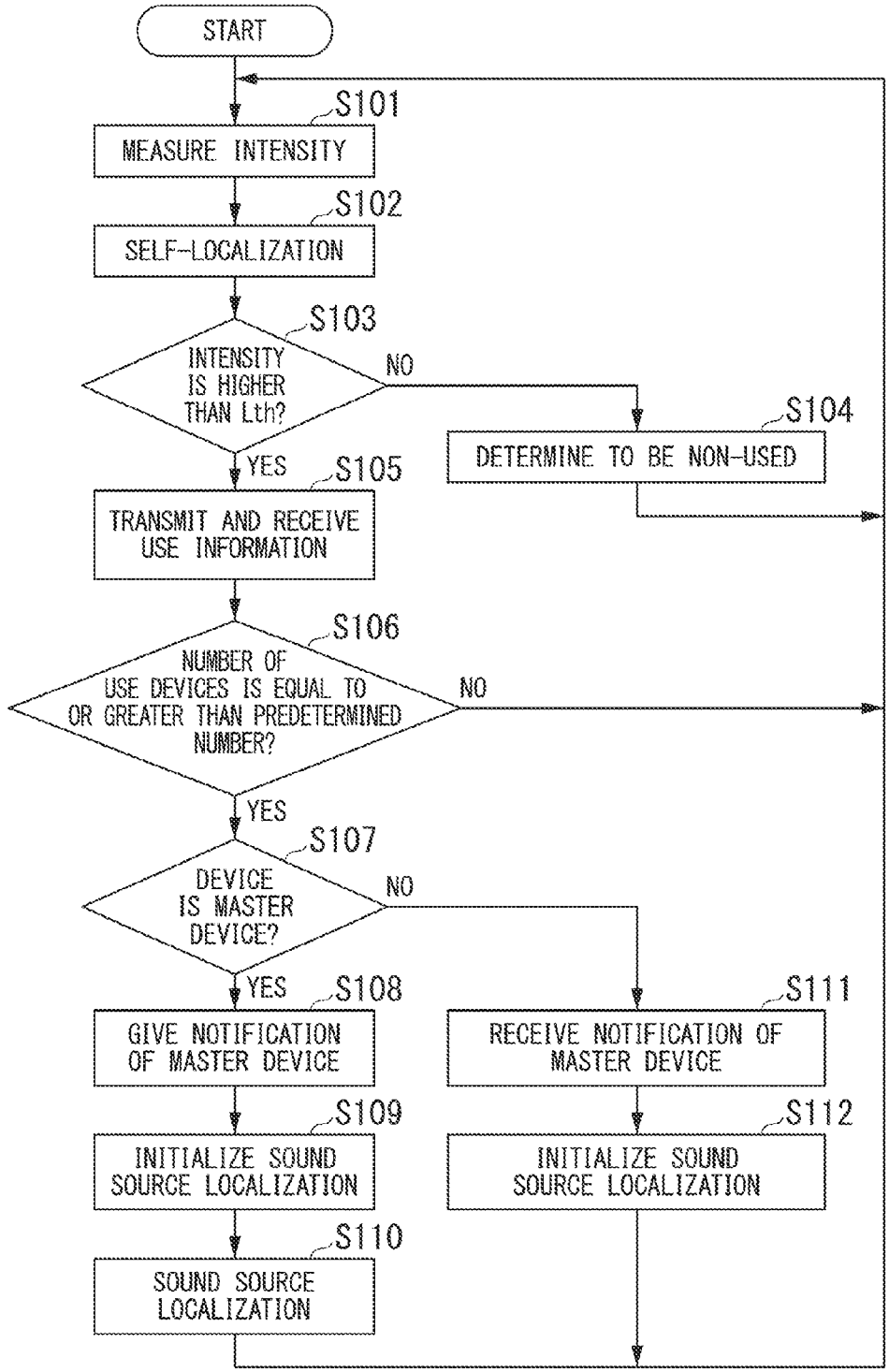
FIG. 4 is a flowchart showing acoustic processing according to the embodiment of the invention.

FIG. 4 is a flowchart showing the acoustic processing according to this embodiment.

(Step S101) The use determination unit 111 filters the acoustic signals input from the sound pickup unit 101 to extract the frequency component of the reference signal of each of the reference sound sources 41-1 to 41-M and measures the intensity of the filtered reference signal. Thereafter, the process progresses to Step S102.

(Step S102) The self-localization unit 112 performs the self-localization based on the motion information input from the motion detection unit 102 and the acoustic signal input from the sound pickup unit 101 to estimate the position of the device. Thereafter, the process progresses to Step S103.

(Step S103) The use determination unit 111 determines whether or not a measured reference intensity is higher than the threshold value $L_{th}$ of intensity determined in advance for the reference sound sources 41-1 to 41-M. When it is determined that the reference intensity is higher than the threshold value $L_{th}$ (YES in Step S103), the process progresses to Step S105. When it is determined that the reference intensity is not higher than the threshold value $L_{th}$ (NO in Step S103), the process progresses to Step S104.

(Step S104) The use determination unit 111 determines not to use data acquired by the device for the sound source localization (non-use determination), and transmits use information indicating that the device is a non-use device to other acoustic processing devices 10. Thereafter, the process returns to Step S101.

(Step S105) The use determination unit 111 determines to use data acquired by the device for the sound source localization, and transmits use information indicating that the device is a use device to other acoustic processing devices 10. The use determination unit 111 receives use information from other acoustic processing devices 10. Thereafter, the process progresses to Step S106.

(Step S106) The use determination unit 111 determines whether or not the number of use devices is equal to or greater than a predetermined number based on the use information received from other acoustic processing devices 10. When it is determined that the number of use devices is equal to or greater than the predetermined number (YES in Step S106), the process progresses to Step S107. When it is determined that the number of use devices is less than the predetermined number (NO in Step S106), the process returns to Step S101.

(Step S107) The use determination unit 111 determines whether or not the device is a master device. When the device is the acoustic processing device 10 which first becomes a use device among the use devices, the use determination unit 111 determines that the device is a master device, and otherwise, the use determination unit 111 determines that the device is a slave device. When it is determined that the device is a master device (YES in Step S107), the process progresses to Step S108. When it is determined that the device is a slave device (NO in Step S107), the process progresses to Step S111.

(Step S108) The use determination unit 111 transmits the master device notification information indicating that the device is a master device to other use devices. Thereafter, the process progresses to Step S109.

(Step S109) The sound source localization unit 113 performs initialization for performing the sound source localization. The sound source localization unit 113 receives the acoustic signals and the positional information from other use devices, receives the acoustic signal from the sound pickup unit 101 as input, and receives the positional information from the self-localization unit 112 as input. Thereafter, the process progresses to Step S110.

(Step S110) The sound source localization unit 113 performs the sound source localization based on the acoustic signal filtered for each use device and the positional information acquired by the use device to acquire the sound source space information of each sound source. In the filtering, the frequency component of the reference signal incoming from each of the reference sound sources 41-1 to 41-M is removed. The sound source localization unit 113 transmits the acquired sound source space information to the information processing device 20. Thereafter, the process returns to Step S101.

(Step S111) The use determination unit 111 receives, from a second device as a master device, the master device notification information indicating that the second device is a master device, and determines that the device (first device) is a slave device. Thereafter, the process progresses to Step S112.

(Step S112) The sound source localization unit 113 transmits the acoustic signal input from the sound pickup unit 101 and the positional information input from the self-localization unit 112 to the master device for the initialization in the master device. Thereafter, the process progresses to Step S101.

(Evaluation Experiment)

Next, an evaluation experiment of the acoustic processing device 10 according to this embodiment will be described. In the experiment, unless otherwise stated, a plurality of acoustic processing devices 10 were made to fly in a 2.6 m-square region while being maintained at a given height. Five reference sound sources 41 were installed around the region, and sound waves were radiated from each reference sound source 41 in all directions. In the region, an unknown target sound source 51 to be detected was installed, and sound waves were radiated in all directions. For every trial, the position of the target sound source 51 was determined randomly, and the acoustic processing device 10 was operated. Gaussian noise was added to a sensor value indicating space information detected by the motion detection unit 102 such that a signal-to-noise radio (SNR) became 30 dB. The SNR of ego noise generated from the mobile object provided in the acoustic processing device 10 to the intensity of measured sound is 0 dB to −10 dB. The SNR indicates that the level of noise is higher than the level of the acoustic signal.

In the preliminary verification, the estimation accuracy by the self-localization described above was compared with a related art method.

The method of self-localization of this embodiment is different from the related art method in which a delay is used, in that the intensity of a component from each reference sound source is used. As the index of the evaluation, the distance between an estimated position of the acoustic processing device 10 and an actual position was calculated as a self-localization error. In the related art method, the self-localization error is 429.9 cm; however, in this embodiment, the self-localization error is an average of 26.5 cm, and apparent improvement has been recognized. Considering that the position of the acoustic processing device 10 is used for the sound source localization, the result indicates that the position of an unknown target sound source can be estimated by the sound source localization with high accuracy.

Next, the influence of superimposition of noise by the mobile objects of a plurality of acoustic processing devices 10 on the individual acoustic processing device 10 was evaluated. The acoustic processing devices 10 were made to fly in a 20 cm-square plane randomly, and the number of acoustic processing devices 10 made to fly was changed for every trial.

Figure 5:
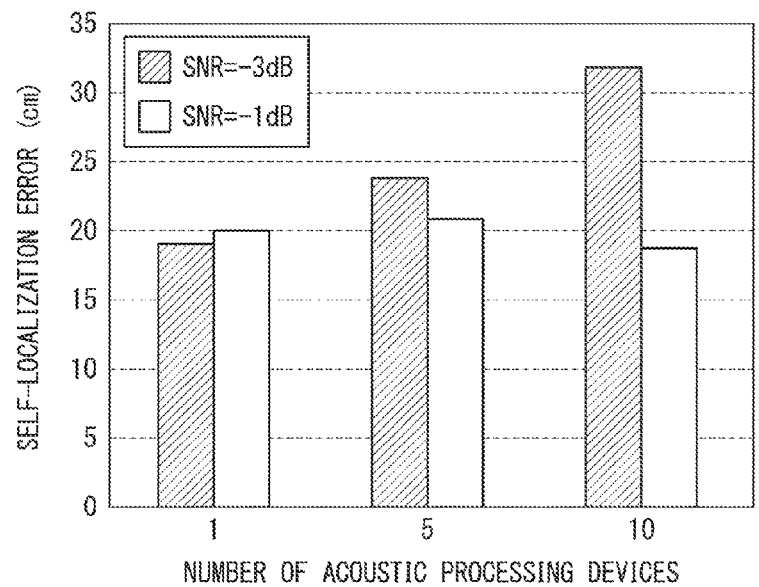
FIG. 5 is a diagram showing the influence of superimposition of noise on an individual acoustic processing device.

FIG. 5 is a diagram showing the influence of superimposition of noise on the individual acoustic processing device 10. FIG. 5 shows an average self-localization error when the number of acoustic processing devices 10 is 1, 5, and 10. When the SNR by ego noise per acoustic processing device 10 is −3 dB, the self-localization error increases with an increase in the number of acoustic processing devices 10. For example, when the number of acoustic processing devices 10 is 1, the self-localization error is 19 cm. When the number of acoustic processing devices 10 is 10, the self-localization error is 32 cm. The result indicates that, when the SNR is −3 dB and ego noise dominates, the accuracy of the self-localization is deteriorated due to superimposition of noise caused by the acoustic processing devices 10. However, when the SNR is −1 dB, the self-localization error is substantially constant to be 18 cm to 21 cm regardless of the number of acoustic processing devices 10. That is, if the intensity of ego noise is substantially equal to or lower than the intensity of the acoustic signal, the influence of superimposition of noise is not recognized. Considering that the position of the acoustic processing device 10 is used for the sound source localization, the result indicates that deterioration of the accuracy of the sound source localization due to ego noise does not occur.

Next, the influence of the number of acoustic processing devices 10 when detecting the reference sound source was evaluated. Each acoustic processing device 10 was made to fly randomly, and the time (detection time) until the two acoustic processing devices 10 among the acoustic processing devices 10 detected a sound source was measured. The number of acoustic processing devices 10 was changed for every trial.

Figure 6:
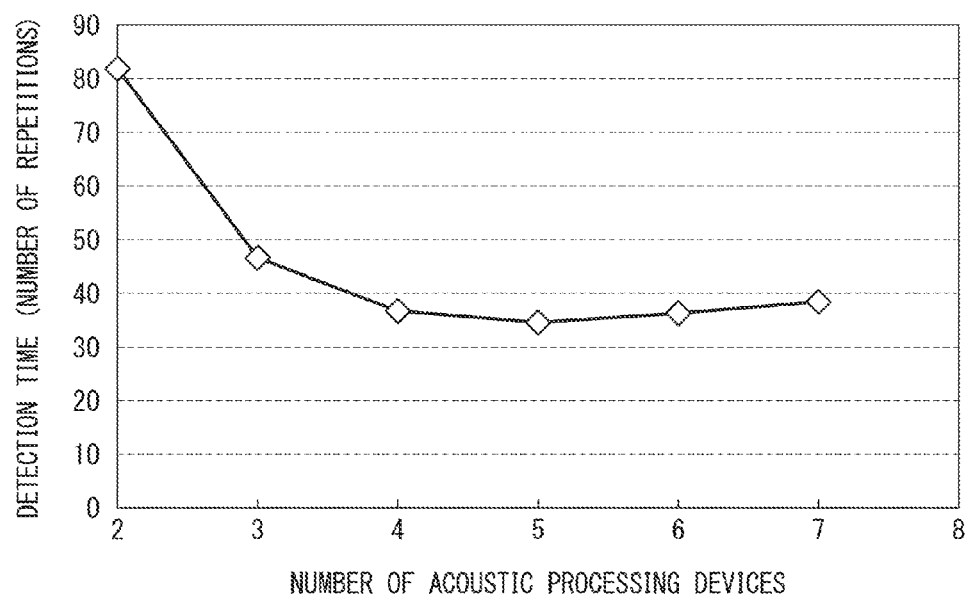
FIG. 6 is a diagram showing the influence of the number of acoustic processing devices on a detection time.

FIG. 6 is a diagram showing the influence of the number of acoustic processing devices 10 on the detection time. The vertical axis represents a detection time, and the horizontal axis represents the number of acoustic processing devices 10. The unit of the detection time is the number of iterations of processing. FIG. 6 shows that the detection time depends on the number of acoustic processing devices 10. When the number of acoustic processing devices 10 is greater than 2, the detection time is significantly shorter than when the number of acoustic processing devices 10 is 2. For example, when the number of acoustic processing devices 10 is 4, the detection time is 37 times, and the detection time of 37 times is less than half of 81 times when the number of acoustic processing devices 10 is 2. When the number of acoustic processing devices 10 is 7, the detection time is 40 times and is increased by 3 more than 37 times when the number of acoustic processing devices 10 is 4. If the number of acoustic processing devices 10 is equal to or greater than 3, the influence of the number of acoustic processing devices 10 on the detection time is limited, and thus, this indicates that it should suffice that the number of acoustic processing devices 10 is 3.

As described above, the acoustic processing device 10 according to this embodiment includes the sound pickup unit 101 which records the acoustic signal, the motion detection unit 102 which detects the motion of the device, and the self-localization unit 112 which estimates the position of the device based on the recorded acoustic signal and the detected motion. The acoustic processing device 10 includes the use determination unit 111 which determines whether or not to use the recorded acoustic signal and the positional information indicating the estimated position in the sound source localization unit 113 based on the intensity of the reference signal incoming from the reference sound source 41 determined in advance. The sound source localization unit 113 detects the position of the target sound source to be detected based on the acoustic signal and the positional information acquired from each acoustic processing device 10.

According to this configuration, the position of the device is estimated based on the reference signal included in the recorded acoustic signal and the detected motion, and it is determined whether or not to use the acoustic signal and the positional information indicating the estimated position in the sound source localization unit based on the intensity of the reference signal. For this reason, since the positional information of the device is autonomously acquired along with the recorded acoustic signal, a microphone array is formed by a plurality of acoustic processing devices 10 each provided with one sound pickup unit 101, and even if calibration is not performed in advance, the sound source localization becomes possible.

The use determination unit 111 in the acoustic processing device 10 transmits the master device notification information indicating that the device is a master device to other acoustic processing devices 10 in a wireless manner based on the time at which it is determined to use the acoustic signal and the positional information for the sound source localization, and the acoustic processing device 10 receives the acoustic signals and the positional information from other acoustic processing devices 10 in a wireless manner.

According to this configuration, it can be uniquely determined that the device is a master device as the reference of the sound source localization, other acoustic processing devices can be notified of the determination result, and the acoustic signals and the positional information indicating the position of each of other acoustic processing devices can be acquired in a wireless manner from other acoustic processing devices. For this reason, it is possible to collect information for performing the sound source localization to the device. Furthermore, since a member for physical wiring is not required when collecting information for performing the sound source localization, the degree of freedom of the arrangement is improved.

The acoustic processing device 10 includes the sound source localization unit 113.

According to this configuration, it is possible to perform the sound source localization in the device using information collected to the device.

When the use determination unit 111 in the acoustic processing device 10 receives the master device notification information indicating that the device is a master device from another acoustic processing device 10, the acoustic processing device 10 transmits the acoustic signal and the positional information of the device to the acoustic processing device, which transmits the master device notification information, in a wireless manner.

With this configuration, the acoustic processing device 10 can recognize another acoustic processing device 10 which is a master device, and can provide the positional information indicating the position of the device and the recorded acoustic signal necessary for the sound source localization to the master device in a wireless manner. Furthermore, since a member for physical wiring is not required when providing information for performing the sound source localization, the degree of freedom of the arrangement is improved.

The acoustic processing device 10 is provided in a quadrocopter.

With this configuration, since the positional information at the time of flying of the device is autonomously acquired along with the recorded acoustic signal, it is possible to perform the sound source localization. Furthermore, since the acoustic processing device 10 is not necessarily supported on the ground, the degree of freedom of the arrangement is improved.

MODIFICATION EXAMPLES

Although the embodiment of the invention has been described referring to the drawings, a specific configuration is not limited to the configuration described above, and various design changes or the like can be made without departing from the scope of the invention.
(Another Example of Sound Source Localization)

For example, in the above description, although an example where the sound source localization unit 113 primarily estimates the position of the sound source using the weighted delay and sum beamforming method has been described, the invention is not limited thereto. The sound source localization unit 113 may use, as other methods, for example, a method which predicts the intensity of the acoustic signal based on the estimated position and updates the position so as to decrease the magnitude of the difference between a predicted value of the predicted intensity and the intensity (measured value) of the acoustic signal acquired by the sound pickup unit 101. According to this method, since it is possible to estimate (distributed processing) the position of the sound source based on the intensity of the acoustic signal acquired by the sound pickup unit 101 of the individual acoustic processing device 10, the acoustic signals are not necessarily transmitted and received among the acoustic processing devices 10. Furthermore, since it is not necessary to simultaneously process the acoustic signals among a plurality of acoustic processing devices 10, a processing amount is decreased significantly. This is because the amount of processing for matrix operation performed in the sound source localization is proportional to the second power of the order of the matrix. In addition, in the use determination unit 111, it is possible to skip the determination of whether or not the device is a master device. The sound source localization unit 113 may use, as such a method, various Kalman filters, for example, any of the EKF and the UKF described above, a Kalman consensus filter (KCF), and an unscented Kalman consensus filter (UKCF) may be used. The sound source localization unit 113 transmits the sound source space information indicating the estimated position of the sound source to the information processing device 20 through the communication unit 121.

Figure 7A:
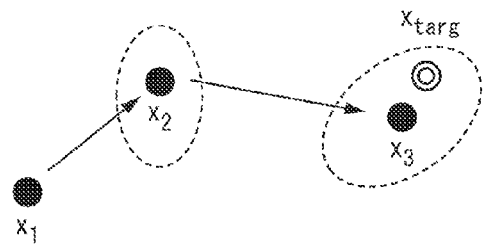
FIG. 7A is a conceptual diagram showing the feature of one method related to sound source localization.
Figure 7B:
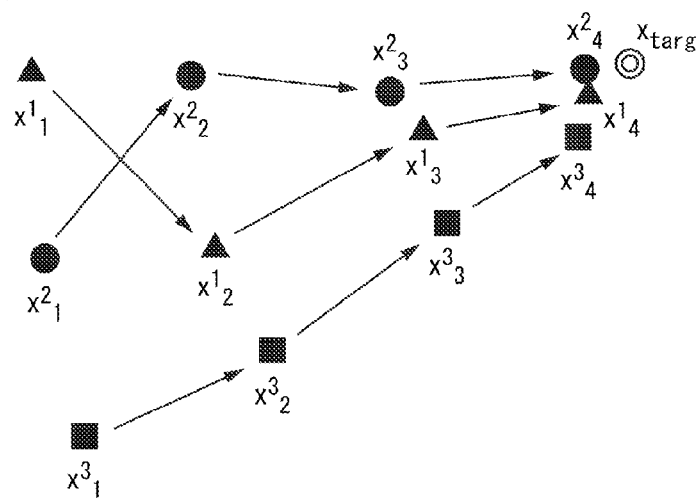
FIG. 7B is a conceptual diagram showing the feature of one method related to sound source localization.
Figure 7C:
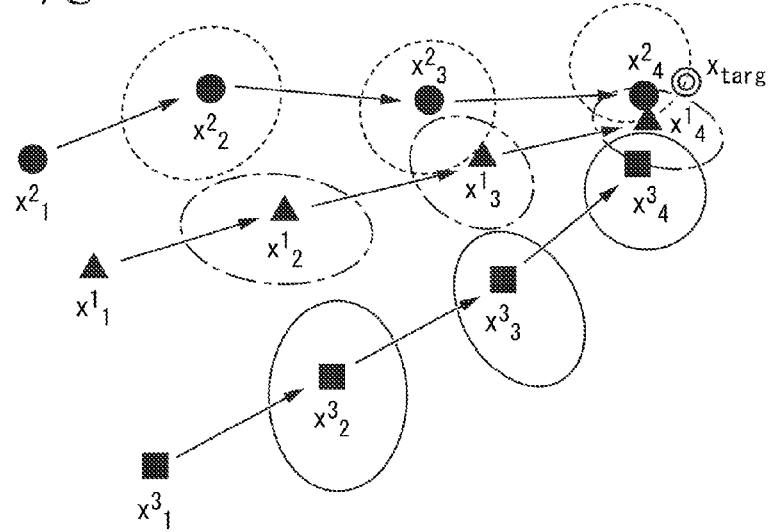
FIG. 7C is a conceptual diagram showing the feature of one method related to sound source localization.

FIGS. 7A to 7C are conceptual diagrams of the features of respective methods related to the sound source localization. FIG. 7A shows the feature of the UKF. FIG. 7B shows the feature of the KCF. FIG. 7C shows the feature of the UKCF. The UKF is a method having the following processes (A1) to (A4). (A1) A predicted value of the state vector at the next time is calculated for each of a plurality of sample points (sigma points) in a search space of the state vector indicating the position. (A2) A weighted average value of predicted values of the state vector calculated for each sigma point is calculated as the predicted value of the state vector at the next time. (A3) The calculated predicted value is corrected such that the difference from a measured value (intensity) is decreased, and (A4) the sigma points distributed according to the magnitude of the distribution indicated by the covariance matrix indicating the distribution of the state vector are set with the corrected value obtained by correction as a reference. The processes of (A1) to (A4) are repeated, whereby each predicted value converges to a target value $x_{targ}$ of a target state vector. In FIG. 7A, symbol ○ indicates the predicted values $x_1$, $x_2$, and the like of the state vector at the respective times, and symbol ⊚ indicates the target value $x_{targ}$ of the state vector. An arrow indicates a process of prediction at each time, and a broken line indicates the distribution of the predicted value of the state vector between the sigma points. Since the predicted value of the state vector is acquired directly using an update model without depending on linear combination of a matrix like a normal Kalman filter, the UKF can also be applied to non-linear prediction.

The KCF is a method which calculates (forms consensus) the corrected values of the state vectors mutually matching each other using the predicted values from other connectable acoustic processing devices 10 (corresponding to the use devices described above) when correcting the predicted value in the device. When using the KCF, the predicted values are shared among all use devices. In FIG. 7B, symbols ○, Δ, and □ indicate the predicted values calculated for the respective acoustic processing devices 10. The state vectors are referred to mutually among the acoustic processing devices 10, whereby each predicted value can converge to the target value $x_{targ}$ of the state vector.

However, since the KCF in the related art includes processing for performing linear combination of a matrix as in the normal Kalman filter, the KCF is not necessarily used for non-linear prediction.

The UCKF is a method which has the following features (B1) and (B2) as the features of the UKF and the KCF. In the UCKF, similarly to the KCF, (B1) the corrected values of the state vectors mutually matching each other among a plurality of acoustic processing devices 10 are calculated. In the UCKF, similarly to the UKF, (B2) the individual acoustic processing device 10 performs weighted averaging for the predicted value of the state vector between the sigma points at each time to calculate the predicted value of the representative state vector. For this reason, the UCKF can also be applied to prediction of a non-linear state vector in the individual acoustic processing device 10.

Next, a specific example of the sound source localization which is performed by the sound source localization unit 113 will be described. Hereinafter, for simplification of description, a case where a sound source does not move as shown in Expression (5) will be primarily described as an example.

$$[x_k] = f([x_k]) + [w_{k-1}] = [x_{k-1}] + [w_{k-1}] \quad (5)$$

In Expression (5), $[x_k]$ is a vector which indicates the state at the time k indicating the sound source position with the position of the acoustic processing device 10 as a reference. [ . . . ] indicates that . . . is a vector or a matrix. $[x_k]$ is a three-dimensional vector $[x_s, y_s, z_s]^T$ with $x_s$, $y_s$, and $z_s$ as elements. Hereinafter, the vector $[x_k]$ is referred to as a state $[x_k]$. T indicates transposition of a vector or a matrix. In Expression (5), f( . . . ) is a function indicating temporal development of . . . . In the example shown in Expression (5), f( . . . ) is an identity function. This means that the prediction step is executed through a state update model without temporal development. $[w_{k-1}]$ indicates a vector with a signal value of process noise at the time k−1 as an element. The signal value of process noise is, for example, Gaussian noise where the time average is 0. Hereinafter, the vector $[w_{k-1}]$ is referred to as process noise $[w_{k-1}]$. When the movement of the sound source position is assumed, and the state $[x_k]$ indicates the position and speed, as the operation shown in f( . . . ), multiplication of the linear operator F described above may be executed.

As a model indicating the relationship between the state $[x_k]$ and a measurement matrix $[z_k]$ indicating the intensity of the acoustic signal from the sound source, a non-linear measurement model shown in Expression (6) is assumed.

$$[z_k] = h([x_k]) + [v_k] \quad (6)$$

In Expression (6), the measurement matrix $[z_k]$ is a matrix which includes the estimated value of the intensity of the acoustic signal at the time k as an element. In the following description, a case of a scalar value where the number of elements of the measurement matrix $[z_k]$ is one row and one column may be taken as an example. $h([x_k])$ indicates intensity $i_{s,k}$ which can be measured in the acoustic processing device 10 at the time k. As shown in Expression (7), the intensity $i_{s,k}$ is inversely proportional to the second power of the distance between the sound source and the acoustic processing device 10. $[v_k]$ indicates a matrix which includes a signal value of measurement noise at the time k as an element. The signal value of measurement noise is, for example, Gaussian noise where the time average is 0. In the following description, the matrix $[v_k]$ may be referred to as measurement noise $[v_k]$. The predicted value of the state $[x_k]$ and the predicted value of the measurement matrix $[z_k]$ may be respectively distinguished as a predicted value $[x^f_k]$ and a predicted value $[z^f_k]$. The predicted value $[x^f_k]$ and a predicted value $[z^f_k]$ related to a specific acoustic processing device 10-1 (where 1 is an integer of 1 to L, L is the number of use devices, that is, the number of acoustic processing devices 10-1 being connected) among a plurality of acoustic processing devices 10 may be referred to as a predicted value $[x^{f,l}_k]$ and a predicted value $[z^{f,l}_k]$. The corrected value of the state $[x_k]$ and the corrected value of the measurement matrix $[z_k]$ of the specific acoustic processing device 10-1 may be respectively referred to as a corrected value $[x^{a,l}_k]$, a corrected value $[z^{a,l}_k]$, and the like.

$$i_{s,k} = \frac{I_s}{x_s^2 + y_s^2 + z_s^2} \quad (7)$$

In Expression (7), $I_s$ indicates intensity which can be measured at a predetermined distance (for example, 1 m) from the sound source.

When the UCKF is used in the sound source localization processing, in the initialization (Step S109, FIG. 4), the sound source localization unit 113 sets the following values; an initial state (an initial value of the state $[x_k]$) $[x^a_0]$, an initial error covariance matrix (an initial value of the error covariance matrix $[P_k]$) $[P_0]$, process noise covariance matrix $[Q_k]$, measurement noise covariance matrix $[R_k]$, a consensus coefficient $\epsilon$, a weight coefficient $W^0$, and a state dimension n. The initial state $[x^a_0]$ is, for example, $[10\ 30\ 20]^T$. The initial error covariance matrix $[P_0]$ is, for example, diag[400 400 400]. diag[ . . . ] indicates a diagonal matrix which has . . . as a diagonal element. The process noise covariance matrix $[Q_k]$ is diag[0.0005 0.00005 0.0005]. The measurement noise covariance matrix $[R_k]$ is, for example, 200000000000.0. In the following description, the consensus coefficient $\epsilon$ is a positive real number equal to or less than 1, for example, 0.01. The consensus coefficient $\epsilon$ is a coefficient for controlling the rate at which the predicted value calculated by the individual acoustic processing device 10 converges among the acoustic processing devices 10. The weight coefficient $W^0$ indicates a weight coefficient for a sigma point (zero-th order sigma point) related to the expected value among all sigma points. The weight coefficient $W^0$ is a real number greater than $-1$ and smaller than 1, for example, 0.0009. The weight coefficient $W^j$ for another sigma point (j-th order sigma point, where j is an integer of 1 to 2n) is given as $(1-W^0)/n$. The state dimension n is a coefficient which defines the number (2n+1) of sigma points. The state dimension n is, for example, 3. The values described above may be changed according to all conditions, such as system scale related to execution, operation accuracy, and acoustic environment.

Figure 8:
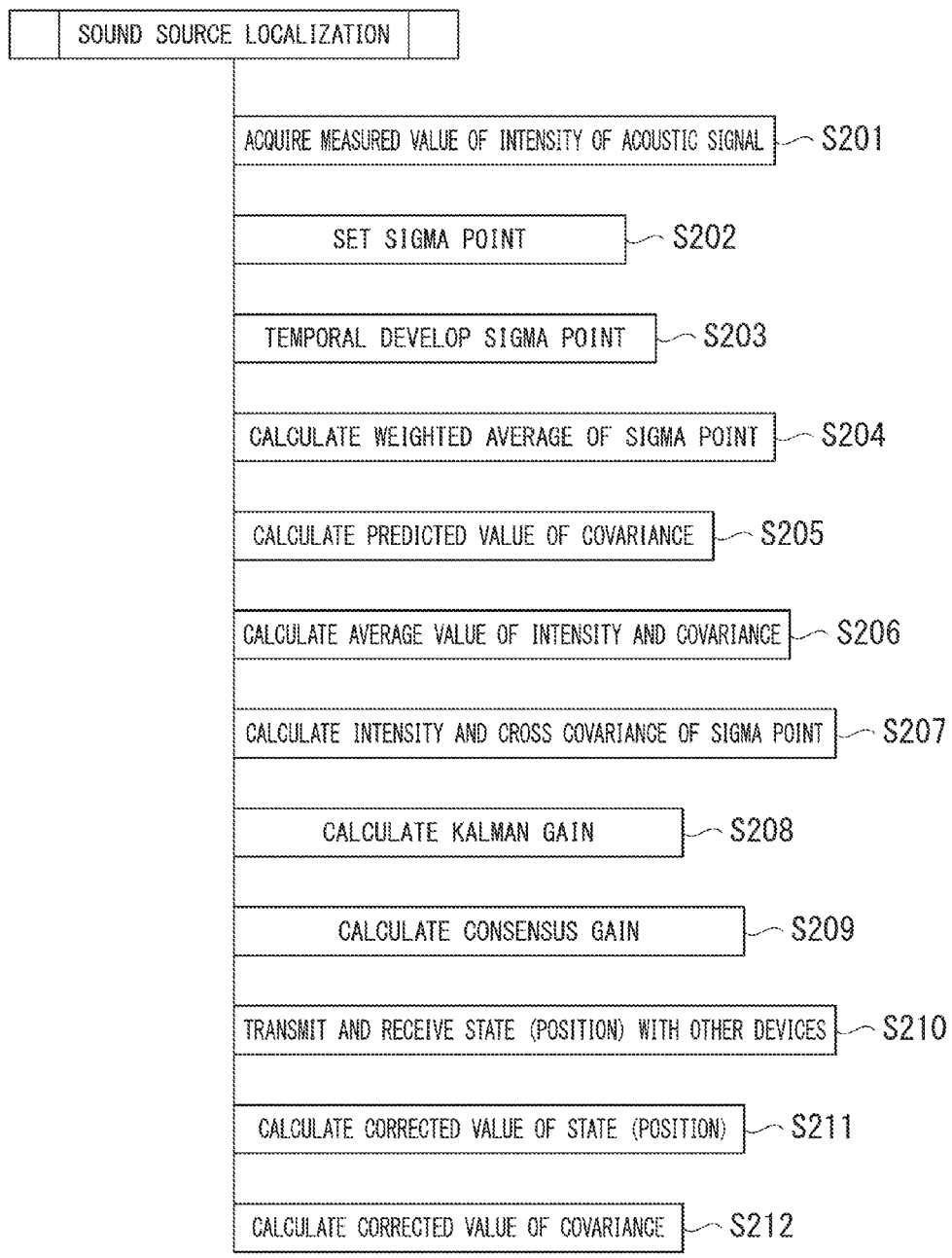
FIG. 8 is a flowchart showing an example of sound source localization processing.

FIG. 8 is a flowchart showing an example of sound source localization processing. In the example shown in FIG. 8, a case of using the UCKF is taken as an example. Among Steps S201 to S212 shown in FIG. 8, processing of Steps S202 to S206 is processing related to prediction. Processing of Steps S207 to S212 is processing related to update (correction). Processing of Steps S209 to S212 is processing which is executed even when the KCF is used. Processing of Steps S202 to S208 is processing which is executed even when the UKF is used.

(Step S201) The sound source localization unit 113 calculates the intensity of the acoustic signal input from the sound pickup unit 101 and constructs the measurement matrix $[z_k]$ indicating the calculated intensity at this time (time k). In the following description, the intensity calculated from the acoustic signal from the sound pickup unit 101 is referred to as "measured value of intensity", and is distinguished from a "predicted value of intensity" which is predicted intensity. Thereafter, the process progresses to Step S202.

(Step S202) The sound source localization unit 113 sets the sigma point based on a corrected value $[x^a_{k-1}]$ of the state and a corrected value $[P_{k-1}]$ of the error covariance matrix at the time k-1. As shown in Expression (8), the sound source localization unit 113 determines the corrected value $[x^a_{k-1}]$ at the time k-1 as the zero-th order sigma point $[x^0_{k-1}]$.

$$[x^0_{k-1}] = [x^a_{k-1}] \quad (8)$$

The sound source localization unit 113 sets the first to n-th order sigma points $[x^j_{k-1}]$ as shown in Expression (9), and sets the (n+1)th to 2n-th order sigma points $[x^{j+n}_{k-1}]$ as shown in Expression (10).

$$[x^j_{k-1}] = [x^a_{k-1}] + \left(\sqrt{\frac{n}{1-W^0}[P_{k-1}]}\right)_j, j = 1 \ldots n \quad (9)$$

$$[x^{j+n}_{k-1}] = [x^a_{k-1}] - \left(\sqrt{\frac{n}{1-W^0}[P_{k-1}]}\right)_j, j = 1 \ldots n \quad (10)$$

In Expressions (9) and (10), $( \ldots )_j$ indicates a vector which becomes the element of the j-th column of the matrix . . . .

Thereafter, the process progresses to Step S203.

(Step S203) The sound source localization unit 113 temporally develops each sigma point $[x^j_{k-1}]$ at each time k-1 to calculate a predicted value $[x^j_k]$ of the sigma point at the time k as shown in Expression (11). However, as described above, when it is assumed that the sound source remains stationary, each sigma point $[x^j_{k-1}]$ at the time k-1 shown in Expression (10) is determined as the predicted value $[x^j_k]$ of the sigma point at the time k. Thereafter, the process progresses to Step S204.

$$[x^j_k] = ([x_{k-1}{}^j]) = [x_{k-1}{}^j] \quad (11)$$

(Step S204) The sound source localization unit 113 calculates the expected value among the sigma points given by the weighted average of the predicted values $[x^{f,j}_k]$ of the sigma point at the time k as the predicted value $[x^f_k]$ of the state as shown in Expression (12). Thereafter, the process progresses to Step S205.

$$[x^f_k] = \sum_{j=0}^{2n} W^j x^j_k \quad (12)$$

(Step S205) The sound source localization unit 113 calculates a predicted value $[P^f_k]$ of the error covariance matrix at the time k based on the difference between the predicted value $[x^j_k]$ of the sigma point at the time k and the predicted value $[x^f_k]$ which is the weighted average of the predicted values $[x^j_k]$, and the process noise covariance matrix $[Q_k]$ at the time k as shown in Expression (13).

$$[P_k^f] = \sum_{j=0}^{2n} W^j([x_k^j] - [x_k^f])([x_k^j] - [x_k^f])^T + [Q_k] \qquad (13)$$

A first term on the right side of Expression (13) indicates that the total of a product obtained by multiplying a matrix, which is a product of a vector with the difference between the predicted value $[x_k^j]$ of each sigma point and the expected value $[x_k^f]$ of the predicted values $[x_k^j]$ as an element and a transposed vector of the vector, by the weight coefficient $W_j$ is calculated. That is, Expression (13) indicates that the process noise covariance matrix $[Q_{k-1}]$ at the time k−1 is added to the matrix obtained by the total of the first term on the right side to calculate the predicted value $[P_k^f]$ of the error covariance matrix at the time k.

That is, the predicted value $[P_k^f]$ of the error covariance matrix is a matrix which represents the distribution of the difference between the predicted value $[x_k^j]$ of the state at each sigma point and the expected value $[x_k^f]$ of the predicted values $[x_k^j]$. Thereafter, the process progresses to Step S206.

(Step S206) The sound source localization unit 113 calculates the predicted value $[x_k^f]$ of the measurement matrix indicating the weighted average value of intensity for each sigma point $[x_k^j]$ at the time k using Expressions (14) and (15).

$$[x_k^j] = h([x_k^j]) \qquad (14)$$

Expression (14) indicates that the measurement matrix $[z_k^j]$ is calculated for the sigma point $[x_k^j]$ using the nonlinear measurement model shown in Expression (6).

$$[z_k^f] = \sum_{j=0}^{2n} W^j[z_k^j] \qquad (15)$$

Expression (15) indicates that the total of the product obtained by multiplying the measurement matrix $[z_k^j]$ of each sigma point by the weight coefficient $W^j$ is calculated to thereby calculate the predicted value $[z_k^f]$ of the measurement matrix as the expected value among the sigma points.

The sound source localization unit 113 calculates a covariance matrix $Cov([z_k^f])$ based on the difference between the measurement matrix $[z_k^j]$ of each sigma point at the time t and the predicted value $[z_k^f]$ of the measurement matrix, and the covariance matrix $[R_k]$ of the measurement noise at the time k using Expression (16). The covariance matrix $Cov([z_k^f])$ is a covariance matrix indicating a covariance of intensity at the time k.

$$Cov([z_k^f]) = \sum_{j=0}^{2n} W^j([z_k^j] - [z_k^f])([z_k^j] - [z_k^f])^T + [R_k] \qquad (16)$$

A first term on the right side of Expression (16) indicates that the total of a product obtained by multiplying a matrix, which is a product of a matrix having, as the element, the difference between the measurement matrix $[z_k^j]$ calculated for each sigma point and the predicted value $[z_k^f]$ of the measurement matrix as the average value of the measurement matrices $[z_k^j]$ and a transposed matrix of the matrix, by the weight coefficient $W^j$ is calculated. That is, Expression (16) indicates that the covariance matrix $[R_k]$ of measurement noise is further added to the matrix by the total in the first term on the right side to calculate the covariance matrix $Cov([z_k^f])$ of intensity. Thereafter, the process progresses to Step S207.

(Step S207) The sound source localization unit 113 calculates a cross covariance matrix $Cov([x_k^f],[z_k^f])$ of the predicted value $[x_k^j]$ of each sigma point at the time k and the measurement matrix $[z_k^j]$ of each sigma point using Expression (17).

$$Cov([x_k^f], [z_k^f]) = \sum_{j=0}^{2n} W^j([x_k^j] - [x_k^f])([z_k^j] - [z_k^f])^T \qquad (17)$$

Expression (17) indicates that the total of the matrix obtained by multiplying the product of the difference between the predicted value $[x_k^j]$ of each sigma point at the time k and the predicted value $[x_k^f]$ as the average value of the predicted values $[x_k^j]$ and the transposed matrix of the difference between the measurement matrix $[z_k^j]$ of each sigma point and the predicted value $[z_k^f]$ as the average value of the measurement matrices $[z_k^j]$ by the weight coefficient $W^j$ among the sigma points is calculated as the cross covariance matrix $Cov([x_k^f],[z_k^f])$. Thereafter, the process progresses to Step S208.

(Step S208) As shown in Expression (18), the sound source localization unit 113 multiplies an inverse matrix $Cov^{-1}([z_k^f])$ of the covariance matrix $Cov([z_k^f])$ by the cross covariance matrix $Cov([x_k^f],[z_k^f])$ to calculate a Kalman gain $K_k$. Thereafter, the process progresses to Step S209.

$$[K_k] = Cov([x_k^f],[z_k^f])Cov^{-1}([z_k^f]) \qquad (18)$$

(Step S209) As shown in Expression (19), the sound source localization unit 113 calculates a consensus gain $[C_k]$ by multiplying a value obtained by normalizing the predicted value $[P_k^f]$ of the covariance by the consensus coefficient $\epsilon$. In the normalization, the predicted value $[P_k^f]$ is divided by a value obtained by adding 1 to a Frobenius norm $|[P_k^f]|_F$ as an index of the magnitude of the predicted value $[P_k^f]$. The addition of 1 is to prevent division by zero. The added value may not necessarily be 1 as long as the value is a positive value sufficiently smaller than the magnitude of the predicted value $[P_k^f]$. Thereafter, the process progresses to Step S210.

$$[C_k] = \varepsilon \frac{[P_k^f]}{1 + |[P_k^f]|_F} \qquad (19)$$

(Step S210) The predicted value $[x_k^{f,l}]$ of a state at the time k calculated by the sound source localization unit 113 is represented by a local coordinate system with the position of the device as a reference. Accordingly, the sound source localization unit 113 performs coordinate conversion of the predicted value $[x_k^{f,l}]$ of the state to the predicted value of a state represented by a global coordinate system of the entire acoustic processing system 1. The sound source localization unit 113 transmits state data indicating the predicted value of the state subjected to coordinate conversion to each of other acoustic processing devices 10-m (where m is an integer of 1 to L and is a number other than 1 indicating the device; hereinafter, referred to as other devices) through the communication unit 121.

The sound source localization unit 113 receives state data indicating the predicted value of the state at the time k from each of other devices through the communication unit 121. The sound source localization unit 113 performs coordinate conversion of the predicted value of the state to a predicted value $[x^{f,m}_k]$ of a state represented by the local coordinate system of the device.

The transmitted and received state data indicates the position of the sound source predicted in each acoustic processing device 10. In the coordinate conversion from the local coordinate system to the global coordinate system, the sound source localization unit 113 adds the coordinate of the position of the device calculated by the self-localization unit 112 to the coordinate of the sound source indicated by the predicted value $[x^{f,l}_k]$ of the state represented by the local coordinate system. In the coordinate conversion from the global coordinate system to the local coordinate system, the sound source localization unit 113 subtracts the coordinate of the position of the device calculated by the self-localization unit 112 from the coordinate of the sound source indicated by the predicted value of the state represented by the global coordinate system.

Thereafter, the process progresses to Step S211.

(Step S211) The sound source localization unit 113 corrects the predicted value $[x^{f,l}_k]$ of the state in the device based on the difference between the predicted value $[x^{f,m}_k]$ of the state in another device and the predicted value $[x^{f,l}_k]$ of the state in the device using Expression (20).

$$[x^{a,l}_k] = [x^{f,l}_k] + [K_k]([z_k] - [z^f_k]) + [C_k]\sum_{m=1}^{L}([x^{f,m}_k] - [x^{f,l}_k]) \quad (20)$$

A second term on the right side of Expression (20) indicates that the Kalman gain $[K_k]$ at the time k is multiplied by the difference between the measurement matrix $[z_k]$ indicating the measured value of the intensity in the device and the predicted value $[z^f_k]$ of the measurement matrix to calculate a correction amount based on a prediction error of intensity. A third term on the right side of Expression (20) indicates that the consensus gain $[C_k]$ is multiplied by the total of the difference between the predicted value $[x^{f,m}_k]$ of the state in another device and the predicted value $[x^{f,l}_k]$ of the state in the device to calculate a correction amount based on the difference in the predicted value of the position between the devices. That is, Expression (20) indicates that the correction amount based on the prediction error of intensity and the correction amount based on the difference in the predicted value of the position between the devices are added to the predicted value $[x^{f,l}_k]$ of the state in the device to calculate the corrected value $[x^{a,l}_k]$ of the state at the time k. Thereafter, the process progresses to Step S212.

(Step S212) As shown in Expression (21), the sound source localization unit 113 corrects the predicted value $[P^f_k]$ of the covariance matrix of the state at the time k based on the Kalman gain $[K_k]$ and the covariance matrix $Cov([z^f_k])$ of intensity.

$$[P_k] = [P^f_k] - [K_k]Cov([z^f_k])[K_k]^T \quad (21)$$

Expression (21) indicates that a matrix obtained by multiplying a transposed matrix $[K_k]^T$ of the Kalman gain $[K_k]$ by the covariance matrix $Cov([z^f_k])$ of intensity and the Kalman gain $[K_k]$ is subtracted from the predicted value $[P^f_k]$ of the covariance matrix of the state to calculate a corrected value $[P_k]$ of the covariance matrix of the state.

Thereafter, the time k is updated to the time k+1, and the process returns to Step S201.

The self-localization unit 112 may use any of the UKF, the KCF, and the UCKF described above, instead of the EKF, as a method used when estimating the positions of the reference sound sources 41-1 to 41-M with the device as a reference in the self-localization.

As described above, the sound source localization unit 113 calculates the predicted value of the intensity of the acoustic signal based on the predicted value of the position of the target sound source, for example, using various Kalman filters. The sound source localization unit 113 updates the position of the target sound source to be detected so as to decrease the magnitude of the difference between the calculated predicted value of the intensity and the measured value of the intensity of the acoustic signal recorded by the sound pickup unit 101.

With this processing, it is possible to perform the sound source localization based on the acoustic signal acquired by the individual acoustic processing device 10. The individual acoustic processing device 10 is provided with the sound source localization unit 113 (self-localization), whereby it is not necessary to transmit and receive the acoustic signal between the acoustic processing devices 10, and it is therefore possible to effectively utilize the transmission capacity between the acoustic processing devices 10. Furthermore, it is not necessary to simultaneously process the acoustic signals among a plurality of acoustic processing devices 10 like the microphone array processing, and it is therefore possible to reduce a processing amount.

As shown in Expression (20), the sound source localization unit 113 further updates the predicted value of the position of the target sound source so as to decrease the magnitude of the difference between the predicted value of the position of the target sound source and the predicted value of the position of the target sound source based on the acoustic signals recorded in other acoustic processing devices 10.

With this processing, the predicted values of the position of the sound source including different errors depending on the difference in acoustic environment (for example, a noise level, a distance from the target sound source, or the like) or process characteristic (an individual difference of the sound pickup unit 101 or the communication unit 121, or the like) between the acoustic processing devices converge to each other, and the errors are cancelled. For this reason, it is possible to improve the accuracy of the sound source localization. When the sound source localization unit 113 uses the UKF or the UCKF in the sound source localization, the distribution of the predicted value is sampled by the sigma points, and the calculation of the predicted value of the intensity and the calculation of the predicted value of the target sound source are performed for each sigma point. For this reason, the sound source localization unit 113 can also be applied to a non-linear event in which the predicted value of the intensity of the acoustic signal by the sound source is estimated based on the predicted value of the position of the target sound source as shown in Expressions (14) and (15). Furthermore, since the sound source localization unit 113 calculates the covariance matrix indicating the distribution of the predicted value when updating the predicted value, higher order matrix operation is not required. For this reason, it is possible to reduce an operation amount compared to the Kalman filter in the related art.

As shown in Expression (20), the sound source localization unit 113 calculates the total of the difference between the predicted value of the position of the target sound source based on the acoustic signal recorded in another acoustic processing device 10 and the predicted value of the position of the target sound source based on the acoustic signal recorded in the device when updating the position of the target sound source. The sound source localization unit 113 calculates the amount of update by multiplying the product of the calculated difference and the matrix obtained by normalizing the error covariance matrix representing the distribution of the predicted value of the position of the target sound source by a positive consensus coefficient $\epsilon$ equal to or less than 1 as shown in the third term on the right side of Expression (19) and Expression (20). Then, the sound source localization unit 113 updates the predicted value of the position of the target sound source using the amount of update calculated as shown in Expression (20).

With this processing, the amount of update of the predicted value related to the position of the target sound source can be made smaller than the value obtained by normalizing the total of the difference in the predicted value of the position of the target sound source predicted by the individual acoustic processing device according to the distribution of the predicted value. For this reason, it is possible to prevent the divergence of the predicted value of the target sound source in the sound source localization.

In the acoustic processing device 10 described above, although a case where the mobile object is a quadrocopter has been taken as an example, the mobile object is not limited thereto. The mobile object is not limited to a flying object, and an object moving along the ground, for example, a robot, a vehicle, or the like may be used. A robot is, for example, a bipedal robot which includes two legs and is movable while moving the legs. Also, a robot may be a robot which includes a wheel and an axle and is movable while rotating the wheel around the axle.

The mobile object may be a flying object other than a quadrocopter, for example, any form of flying object, such as a helicopter, a glider, a balloon, or an airship.

In the above-described embodiment, although a case where the acoustic processing device 10 includes the sound source localization unit 113 has been taken as an example, the acoustic processing device is not limited thereto. The sound source localization unit 113 in the acoustic processing device 10 may be omitted. When the sound source localization unit 113 is omitted, since the acoustic processing device 10 does not become a master device, the use determination unit 111 may omit the processing for determining whether or not the device is a master device.

Instead of the acoustic processing device 10 provided with the sound source localization unit 113, the information processing device 20 may be provided with the sound source localization unit 113. In this case, each acoustic processing device 10 may transmit the positional information and the acoustic signal of the device to the information processing device 20, or one acoustic processing device 10 as a master device may collect the positional information and the acoustic signal of each acoustic processing device 10 and may transmit the positional information and the acoustic signal collected to the information processing device 20.

Even when the information processing device 20 is provided with the sound source localization unit 113, the sound source localization unit 113 may use a method which predicts the intensity of the acoustic signal based on the estimated position and decreases the magnitude of the difference between the predicted intensity and the measured intensity like the EKF, the UKF, or the UKCF.

In this case, the sound source localization unit 113 calculates the sound source position with each acoustic processing device 10 as a reference based on the acoustic signal received from each acoustic processing device 10. The sound source localization unit 113 performs coordinate conversion from the local coordinate system to the global coordinate system or coordinate conversion from the global coordinate system to the local coordinate system using the positional information received from each acoustic processing device 10.

Part of the above-described acoustic processing device 10, for example, the use determination unit 111, the self-localization unit 112, and the sound source localization unit 113, may be implemented by a computer. In this case, a program for implementing the control function of part of the acoustic processing device 10 may be recorded on a computer-readable recording medium, and the program recorded on the recording medium may be read into a computer system and executed to implement the control function. The "computer system" used herein may be a computer system which is embedded in the acoustic processing device 10 and include an OS and hardware, such as peripheral devices, in addition to a control device, such as a CPU (Central Processing Unit). The "computer-readable recording medium" used herein refers to a portable medium, such as a flexible disk, a magneto-optical disk, a ROM, or a CD-ROM, or a storage device, such as a hard disk embedded in the computer system. The "computer-readable recording medium" may also include a medium which dynamically holds a program for a short period of time, such as a communication line when the program is transmitted through a network, such as the Internet, or a communication line, such as a telephone network line, and a medium which holds a program for a given period of time, such as a volatile memory in a computer system as a server or a client in the above case. Furthermore, the program described above may be a program which implements part of the functions described above, or may be a program which can implement the functions described above in combination with a program already recorded in the computer system.

Part or all of the use determination unit 111, the self-localization unit 112, and the sound source localization unit 113 in the above-described embodiment may be implemented as an integrated circuit, such as LSI (Large Scale Integration). Each of the functional blocks of the use determination unit 111, the self-localization unit 112, and the sound source localization unit 113 may be individually implemented in the form of a processor or part or all of the functional blocks may be integrated in the form of processors. A method of implementing the functional blocks in the form of an integrated circuit is not limited to LSI, but the functional blocks may be implemented in the form of a dedicated circuit or a general-purpose processor. Furthermore, when the advancement of semiconductor technology allows the advent of integrated circuit technology replacing LSI, an integrated circuit based on the technology may be used.

Although the preferred embodiment of the invention has been described and shown, the invention is not limited to the above-described embodiment, and the addition, omission, and substitution of the configuration, and other changes may be made without departing from the scope of the invention. The invention is not limited by the above description, but is limited only by the appended claims.

The invention claimed is:
1. An acoustic processing device comprising:
a sound pickup unit configured to record an acoustic signal;

a motion detection unit configured to detect the motion of the device;

a self-localization unit configured to estimate the position of the device based on the acoustic signal and the motion; and a use determination unit configured to determine whether or not to use the acoustic signal in a sound source localization unit detecting the position of a target sound source to be detected based on the intensity of a reference signal incoming from a reference sound source determined in advance.

2. The acoustic processing device according to claim 1, wherein the sound source localization unit detects the position of the target sound source based on positional information indicating the position estimated by the self-localization unit, a second acoustic signal acquired from a second acoustic processing device, and second positional information acquired from the second acoustic processing device.

3. The acoustic processing device according to claim 2, wherein the use determination unit transmits master device notification information indicating that the device is a master device to the second acoustic processing device in a wireless manner based on the time at which it is determined to use the acoustic signal and the positional information for sound source localization, and receives the second acoustic signal and the second positional information from the second acoustic processing device in a wireless manner.

4. The acoustic processing device according to claim 2, wherein, when the use determination unit receives, from the second acoustic processing device, master device notification information indicating that the device is a master device, the acoustic signal and the positional information are transmitted to the second acoustic processing device in a wireless manner.

5. The acoustic processing device according to claim 1, wherein the sound source localization unit updates the position of the target sound source so as to decrease the magnitude of the difference between a predicted value of the intensity of an acoustic signal estimated based on a predicted value of the position of the target sound source and a measured value of the intensity of an acoustic signal recorded by the sound pickup unit.

6. The acoustic processing device according to claim 5, wherein the sound source localization unit updates the position of the target sound source so as to decrease the magnitude of the difference between a predicted value of the position of the target sound source and a predicted value of the position of the target sound source based on the second acoustic signal recorded in the second acoustic processing device.

7. The acoustic processing device according to claim 6, wherein, in the update of the position of the target sound source, the sound source localization unit calculates the amount of update by multiplying a product of the total of the difference and a matrix obtained by normalizing a covariance matrix representing the distribution of the predicted value of the position by a positive coefficient equal to or less than 1, and updates the predicted value of the position based on the amount of update.

8. The acoustic processing device according to claim 1, wherein the acoustic processing device is provided in a movable mobile object.

9. The acoustic processing device according to claim 8, wherein the mobile object is a flying object.

10. The acoustic processing device according to claim 8, wherein the mobile object is a robot.

11. An acoustic processing method in an acoustic processing device, the acoustic processing method comprising:

estimating the position of the device based on an acoustic signal recorded by a sound pickup unit and the motion of the acoustic processing device detected by a motion detection unit; and determining whether or not to use the acoustic signal in a sound source localization unit detecting the position of a target sound source to be detected based on the intensity of a reference signal incoming from a reference sound source determined in advance.

* * * * *